(12) United States Patent
Geurts

(10) Patent No.: US 12,739,527 B2
(45) Date of Patent: Sep. 15, 2026

(54) DRIVER MONITORING SYSTEM AND ASSOCIATED IMAGE-CAPTURE METHOD

(71) Applicant: OmniVision Technologies, Inc., Santa Clara, CA (US)

(72) Inventor: Tomas Geurts, Mechelen (BE)

(73) Assignee: OmniVision Technologies, Inc., Santa Clara, CA (US)

( * ) Notice: Subject to any disclaimer, the term of this patent is extended or adjusted under 35 U.S.C. 154(b) by 215 days.

(21) Appl. No.: 18/661,311

(22) Filed: May 10, 2024

(65) Prior Publication Data

US 2025/0350867 A1 Nov. 13, 2025

(51) Int. Cl.

| | |
|---|---|
| ***H04N 25/443*** | (2023.01) |
| ***G06V 20/59*** | (2022.01) |
| ***H04N 25/44*** | (2023.01) |
| ***H04N 25/441*** | (2023.01) |
| ***H04N 25/77*** | (2023.01) |
| ***H04N 25/78*** | (2023.01) |

(52) U.S. Cl.

CPC ......... *H04N 25/443* (2023.01); *G06V 20/597* (2022.01); *H04N 25/44* (2023.01); *H04N 25/441* (2023.01); *H04N 25/77* (2023.01); *H04N 25/78* (2023.01)

(58) Field of Classification Search

CPC .... H04N 25/44; H04N 25/441; H04N 25/443; G06V 20/597

See application file for complete search history.

(56) References Cited

U.S. PATENT DOCUMENTS 5,847,758 A * 12/1998 Iizuka .................. H04N 25/134 348/321
2009/0066782 A1* 3/2009 Choi ...................... H04N 25/47 348/E5.022
2009/0097704 A1* 4/2009 Savidge ............... H04N 25/441 348/222.1
2010/0134662 A1* 6/2010 Bub ..................... H04N 23/667 348/E5.037
2010/0182468 A1* 7/2010 Posch .................. H04N 25/707 348/294
2014/0125815 A1* 5/2014 Holz ...................... H04N 23/81 348/169

(Continued)

*Primary Examiner* — David N Werner
(74) *Attorney, Agent, or Firm* — Cozen O'Connor

(57) ABSTRACT

An image capture method includes capturing, with an image sensor having a pixel array, a first image of a scene by generating a first plurality of pixel signals. The first plurality of pixel signals includes (i) a target pixel-signal group $T_1$, (ii) a remaining pixel-signal group $P_{11}$, and (iii) a remaining pixel-signal group $P_{21}$. The method also includes: transferring the first plurality of pixel signals to a storage region of the image sensor; reading the target pixel-signal group $T_1$ and the remaining pixel-signal group $P_{11}$ from the storage region; capturing a second image of the scene by generating a second plurality of pixel signals that includes a target pixel-signal group $T_2$ corresponding to the target pixel-group; transferring the second plurality of pixel signals to the storage region; and reading the target pixel-signal group $T_2$ and the remaining pixel-signal group $P_{21}$ from the storage region.

37 Claims, 7 Drawing Sheets

| During time segment 502(1): | During time segment 502(2): | During time segment 502(3): | During time segment 502(4): |
|---|---|---|---|
| pixel-signal array 580(1) | pixel-signal array 580(2) | pixel-signal array 580(3) | pixel-signal array 580(4) |
| remaining pixel-signal group 521(1) | remaining pixel-signal group 521(1) | remaining pixel-signal group 521(1) | remaining pixel-signal group 521(1) |
| remaining pixel-signal group 522(1) | remaining pixel-signal group 522(1) | remaining pixel-signal group 522(1) | remaining pixel-signal group 522(1) |
| target pixel-signal group 525(1) | target pixel-signal group 525(2) | target pixel-signal group 525(3) | target pixel-signal group 525(4) |
| remaining pixel-signal group 523(1) | remaining pixel-signal group 523(1) | remaining pixel-signal group 523(1) | remaining pixel-signal group 523(1) |
| remaining pixel-signal group 524(1) | remaining pixel-signal group 524(1) | remaining pixel-signal group 524(1) | remaining pixel-signal group 524(1) |

(56) References Cited

U.S. PATENT DOCUMENTS

| | | | | |
|---|---|---|---|---|
| 2016/0119522 | A1* | 4/2016 | Choi | G06F 3/042 348/302 |
| 2017/0176344 | A9* | 6/2017 | Olsson | H04N 23/58 |
| 2019/0075263 | A1* | 3/2019 | Mlinar | H04N 1/64 |
| 2020/0137338 | A1* | 4/2020 | Ohshitanai | H04N 25/40 |
| 2020/0296763 | A1* | 9/2020 | Lan | H04W 74/04 |
| 2020/0312899 | A1* | 10/2020 | Seo | H04N 25/77 |
| 2021/0258530 | A1* | 8/2021 | Scott | H04N 25/771 |
| 2021/0385389 | A1* | 12/2021 | Lee | H04N 23/741 |
| 2022/0007040 | A1* | 1/2022 | Ward | H04N 19/46 |
| 2022/0141401 | A1* | 5/2022 | Kim | G06T 7/215 |
| 2022/0384499 | A1* | 12/2022 | Jeon | H04N 23/843 |
| 2023/0075657 | A1* | 3/2023 | Sakurabu | H04N 25/44 |
| 2023/0353891 | A1* | 11/2023 | Jang | H04N 23/843 |
| 2023/0353892 | A1* | 11/2023 | Kim | G06T 7/215 |

* cited by examiner

Figure 6:
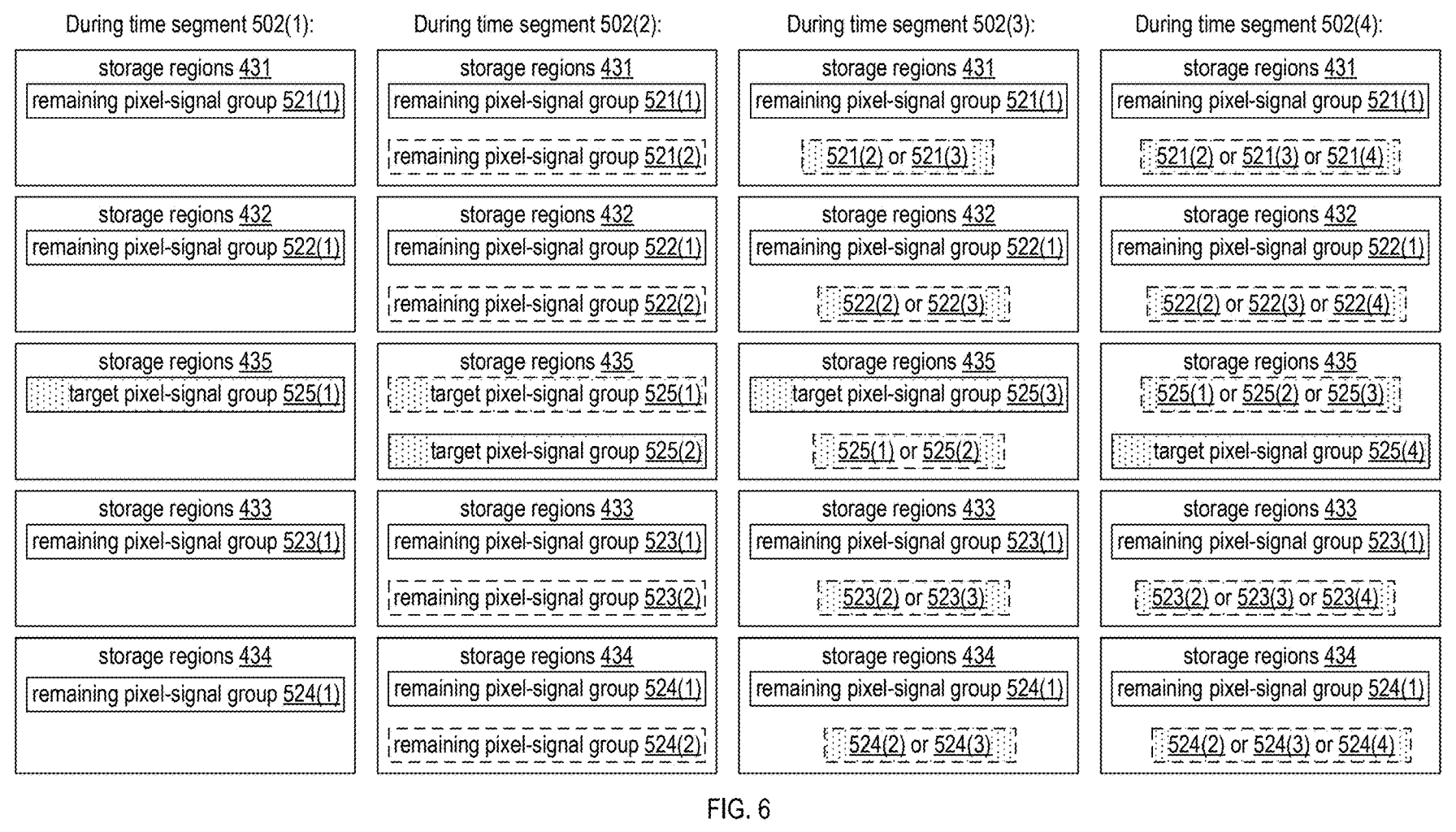

During time segment 502(1):

storage regions 431
remaining pixel-signal group 521(1)

storage regions 432
remaining pixel-signal group 522(1)

storage regions 435
target pixel-signal group 525(1)

storage regions 433
remaining pixel-signal group 523(1)

storage regions 434
remaining pixel-signal group 524(1)

During time segment 502(2):

storage regions 431
remaining pixel-signal group 521(1)
remaining pixel-signal group 521(2)

storage regions 432
remaining pixel-signal group 522(1)
remaining pixel-signal group 522(2)

storage regions 435
target pixel-signal group 525(1)
target pixel-signal group 525(2)

storage regions 433
remaining pixel-signal group 523(1)
remaining pixel-signal group 523(2)

storage regions 434
remaining pixel-signal group 524(1)
remaining pixel-signal group 524(2)

During time segment 502(3):

storage regions 431
remaining pixel-signal group 521(1)
521(2) or 521(3)

storage regions 432
remaining pixel-signal group 522(1)
522(2) or 522(3)

storage regions 435
target pixel-signal group 525(3)
525(1) or 525(2)

storage regions 433
remaining pixel-signal group 523(1)
523(2) or 523(3)

storage regions 434
remaining pixel-signal group 524(1)
524(2) or 524(3)

During time segment 502(4):

storage regions 431
remaining pixel-signal group 521(1)
521(2) or 521(3) or 521(4)

storage regions 432
remaining pixel-signal group 522(1)
522(2) or 522(3) or 522(4)

storage regions 435
525(1) or 525(2) or 525(3)
target pixel-signal group 525(4)

storage regions 433
remaining pixel-signal group 523(1)
523(2) or 523(3) or 523(4)

storage regions 434
remaining pixel-signal group 524(1)
524(2) or 524(3) or 524(4)

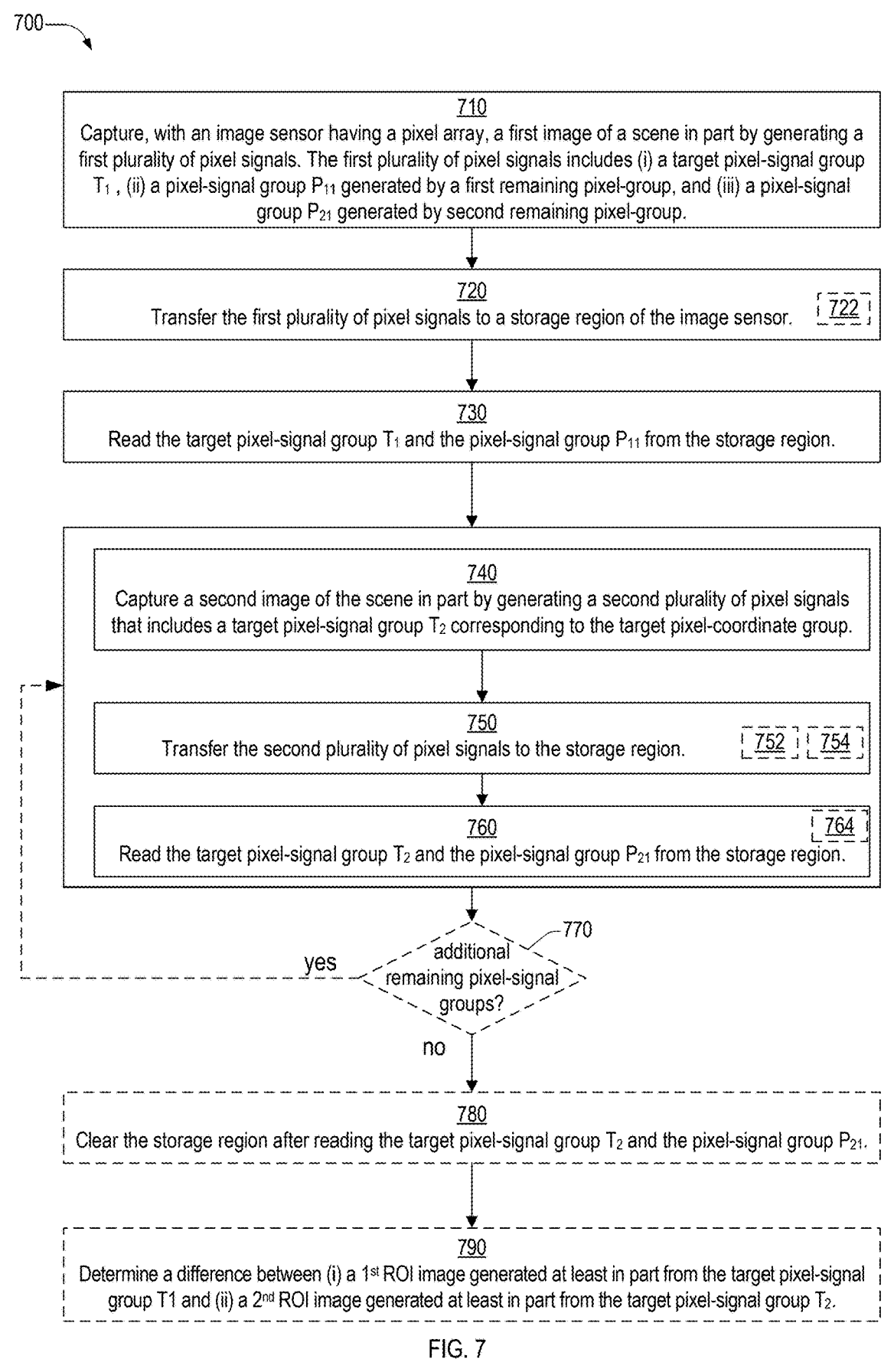

710
Capture, with an image sensor having a pixel array, a first image of a scene in part by generating a first plurality of pixel signals. The first plurality of pixel signals includes (i) a target pixel-signal group $T_1$, (ii) a pixel-signal group $P_{11}$ generated by a first remaining pixel-group, and (iii) a pixel-signal group $P_{21}$ generated by second remaining pixel-group.

720
Transfer the first plurality of pixel signals to a storage region of the image sensor. 722

730
Read the target pixel-signal group $T_1$ and the pixel-signal group $P_{11}$ from the storage region.

740
Capture a second image of the scene in part by generating a second plurality of pixel signals that includes a target pixel-signal group $T_2$ corresponding to the target pixel-coordinate group.

750
Transfer the second plurality of pixel signals to the storage region. 752 754

760
Read the target pixel-signal group $T_2$ and the pixel-signal group $P_{21}$ from the storage region. 764

770
additional remaining pixel-signal groups?
yes
no

780
Clear the storage region after reading the target pixel-signal group $T_2$ and the pixel-signal group $P_{21}$.

790
Determine a difference between (i) a 1st ROI image generated at least in part from the target pixel-signal group T1 and (ii) a 2nd ROI image generated at least in part from the target pixel-signal group $T_2$.

FIG. 7

DRIVER MONITORING SYSTEM AND ASSOCIATED IMAGE-CAPTURE METHOD

BACKGROUND

An increasing number of vehicles include a driver monitoring system (DMS) that captures video of the driver's face and processes the video to detect when the driver is experiencing fatigue. The DMS may monitor the state of the driver's eyes (open or closed, blink rate, pupil dilation) and the driver's gaze (direction, head pose). Accurate driver monitoring requires that the captures video has a high frame rate. However, this requirement places demands on the DMS's power consumption and data rate between the DMS's camera and processor.

SUMMARY OF THE EMBODIMENTS

Embodiments disclosed herein enable a DMS to capture high frame rate video with reduced power and data-rate requirements.

In a first aspect, an image capture method is disclosed. The method includes capturing, with an image sensor having a pixel array, a first image of a scene by generating a first plurality of pixel signals. The first plurality of pixel signals includes (i) a target pixel-signal group $T_1$ generated by a target pixel-group having pixel-coordinates of a target region of the pixel array, (ii) a pixel-signal group $P_{11}$ generated by a first remaining pixel-group having pixel-coordinates of a first remaining pixel-array region of the pixel array, and (iii) a pixel-signal group $P_{21}$ generated by second remaining pixel-group having pixel-coordinates of a second remaining pixel-array region of the pixel array. The method also includes transferring the first plurality of pixel signals to a storage region of the image sensor; and reading the target pixel-signal group $T_1$ and the pixel-signal group $P_{11}$ from the storage region. The method also includes capturing a second image of the scene by generating a second plurality of pixel signals that includes a target pixel-signal group $T_2$ corresponding to the target pixel-group; transferring the second plurality of pixel signals to the storage region; and reading the target pixel-signal group $T_2$ and the pixel-signal group $P_{21}$ from the storage region.

BRIEF DESCRIPTION OF THE FIGURES

FIG. 6 illustrates the pixel-signal groups of FIG. 5 stored by the storage regions of FIG. 4 during the time segments of FIG. 5.

FIG. 7 is a flowchart illustrating an image-capture method that may be implemented by the image sensor of FIG. 3, in an embodiment.

DETAILED DESCRIPTION OF THE EMBODIMENTS

Figure 1:
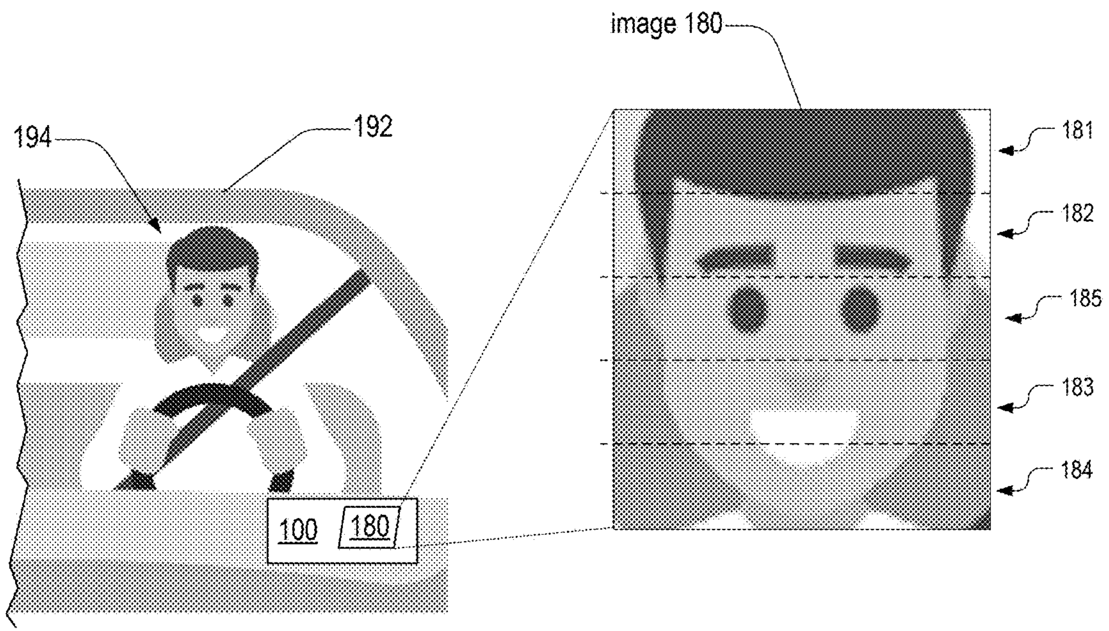
FIG. 1 is a schematic of a car equipped with a driver monitoring system (DMS) that monitors a driver, in an embodiment.
Figure 2:
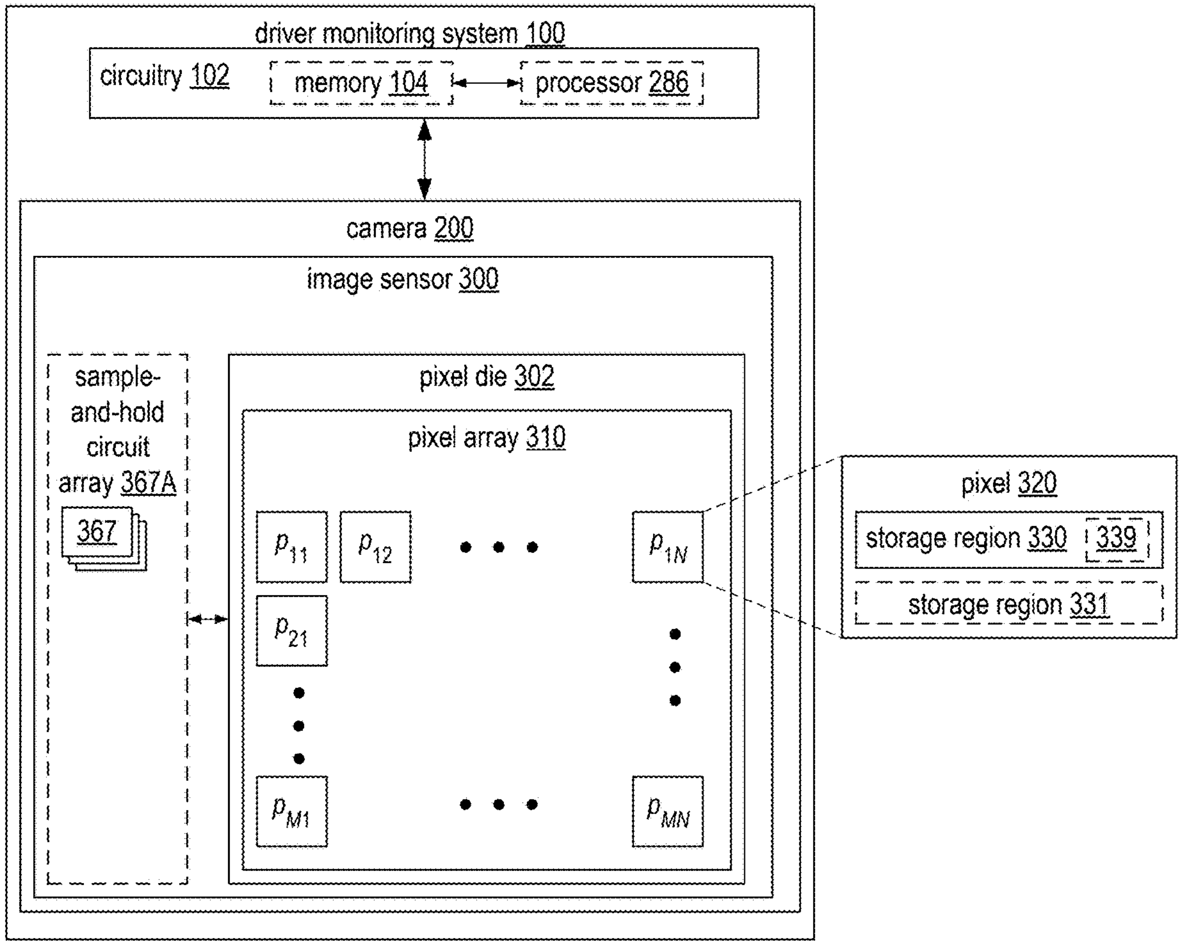
FIG. 2 is a functional block diagram of a camera, image sensor, and pixel array of the DMS of FIG. 1, in an embodiment.

FIG. 1 is a schematic of a car 192 equipped with a driver monitoring system (DMS) 100 that monitors a driver 194. FIG. 2 is a functional block diagram of DMS 100. FIGS. 1 and 2 are best viewed together in the following description.

DMS 100 includes a camera 200 that includes an image sensor 300. Camera 200 captures a sequence of images that includes an image 180. Image 180 includes a target region 185 and a plurality of remaining image regions 181, 182, 183, and 184. While FIG. 1 denotes five image regions, image 180 may have a different number of image regions without departing from the scope hereof. Target region 185 may include the eyes of driver 194, as illustrated in FIG. 1.

DMS 100 may also include circuitry 102 that implements functionality of DMS 100. Circuitry 102 may include at least one of a processor 286 and a memory 104. In embodiments, circuitry 102 is, or includes (as processor 286 for example), an integrated circuit, such as an application-specific integrated circuit and a field-programmable gate array. Part or all of circuitry 102 may be part of image sensor 300.

Memory 104 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 104 may be integrated into processor 286.

Figure 3:
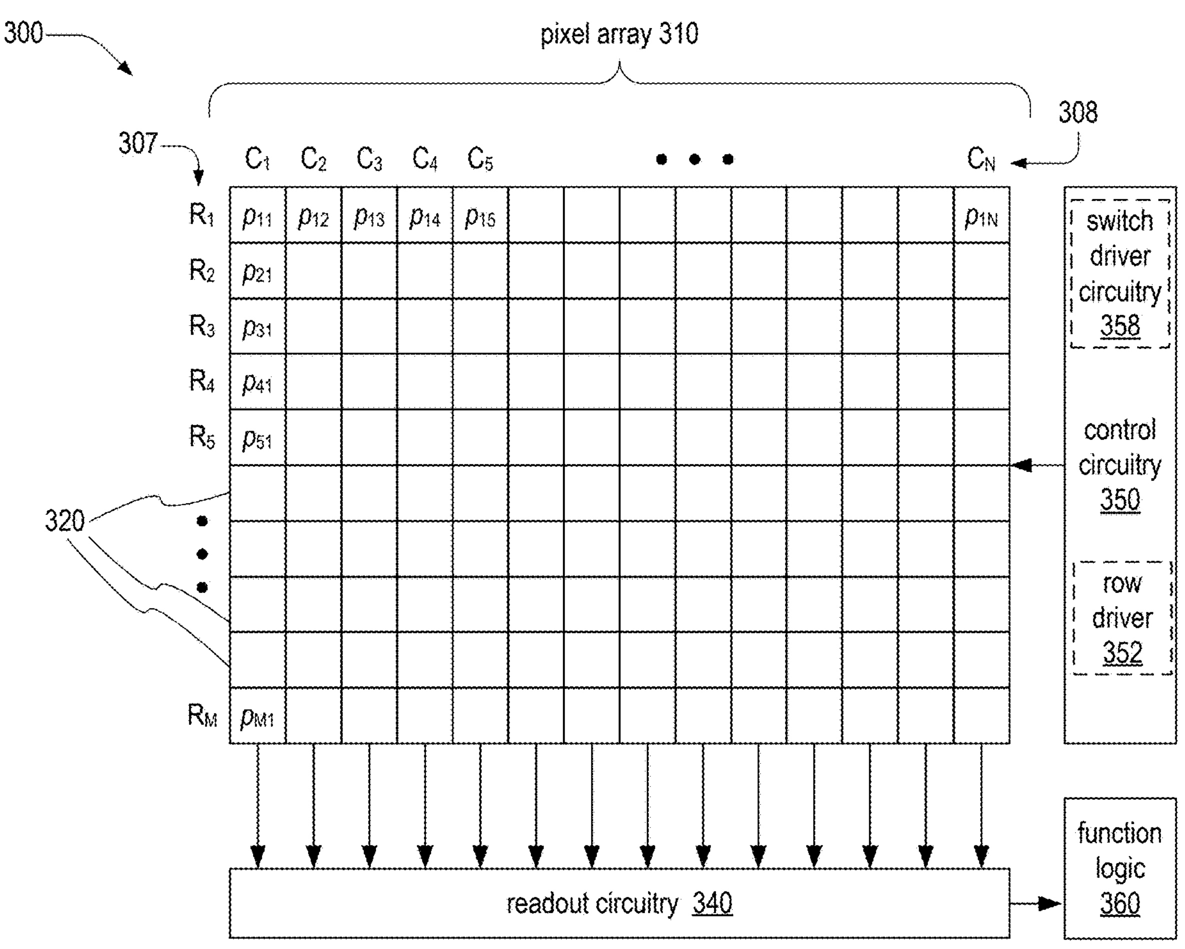
FIG. 3 is a functional block diagram of the image sensor of FIG. 2, in an embodiment.

FIG. 3 is a functional block diagram of image sensor 300. Image sensor 300 includes a pixel array 310 including a two-dimensional array of pixels 320. In embodiments, image sensor 300 includes a pixel die 302 of FIG. 2, which includes pixel array 310. Image sensor 300 may also include a sample-and-hold circuit array 367A, which includes a plurality of sample-and-hold circuits 367. Each circuit 367 may be electrically connected to a respective pixel 320, or a respective group of neighboring pixels 320.

Each pixel 320 includes a storage region 330 as shown in FIG. 2, and may be a complementary-metal-oxide semiconductor (CMOS) pixel, a charge-coupled device (CCD) pixel, or other pixel type. Storage region 330 may be an analog storage element of pixel 320, such as a floating diffusion node. Each pixel 320 may include an additional storage region 331. For example, pixel 320 may be a charge-domain global-shutter (CDGS) pixel or a voltage-domain global-shutter (VDGS) pixel. Storage region 330 may include a target section 339.

Pixel array 310 has M pixel rows 307(1-M) and N pixel columns 308(1-N), where are denoted in FIG. 3 as pixel rows $R_1, R_2, \ldots, R_M$ and pixel columns $C_1, C_2, \ldots, C_N$, respectively. Each pixel 320 is denoted as $p_{mn}$, where indices m and n of pixel coordinate (m,n) denote, respectively, the row and column of the pixel within pixel array 310.

After each pixel 320 has acquired its image charge, the image charge is read out by readout circuitry 340 and transferred to function logic 360. Image sensor 300 may further include control circuitry 350 coupled with array 310 for generating various signals to control operation of each pixel 320. Control circuitry may include a row driver 352.

Figure 4:
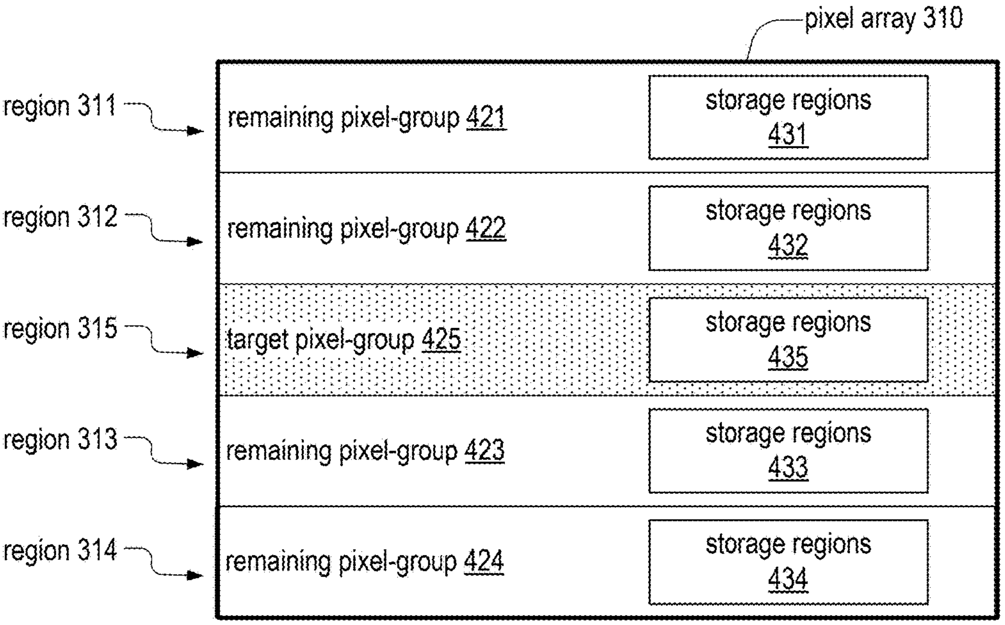
FIG. 4 is a schematic designating multiple pixel-groups and storage regions of the pixel array of FIG. 2, in an embodiment.

FIG. 4 is a functional block diagram of pixel array 310 that designates multiple regions thereof. These regions include a target region 315 and remaining pixel-array regions 311-314, each of which are defined by respective groups of pixel coordinates (m,n). Target region 315 includes a target pixel-group 425. Remaining pixel-array regions 311-314 include respective remaining pixel-groups 421-424. Pixel groups 421-425 generate pixel signals processed by image sensor 300 to generate image regions 181-185, respectively of image 180. While FIG. 4 denotes five pixel-array regions 311-315 defined by respective pixel-groups 421-425, pixel array 310 may be divided into any number of pixel-array regions, $N_R$ in number, without departing from the scope hereof. For example, the total number of pixel-array regions may equal three ($N_R$=3), where one of the regions is target region 315.

The pixel-array regions of pixel array 310 may be non-overlapping and contiguous. Each pixel of pixel array 310 may be in one of the pixel array regions, such that pixel-array regions, e.g., regions 311-315, include all pixels of pixel array 310.

In the example of FIG. 4, each pixel-group 421-425 includes multiple adjacent pixel rows 307. Any two of pixel-groups 421-425 may be non-overlapping, such that no pixel 320 is part of multiple pixel-groups. Target pixel-group 425 may be between two remaining pixel-groups 421-424, as shown in FIG. 4.

A pixel group of pixel array 310 may include part of a pixel row 307 and/or part of a pixel column 308. In embodiments, pixel array 310 may include at least one of (i) a first pixel group that is surrounded by a second pixel group and (ii) a pixel group that includes two or more groups ("islands") of contiguous pixels that are separated by one or more different pixel groups. The shape of a pixel-array region may be polygonal, e.g. rectangular, as the example of FIG. 4, or a polygon having different number of sides. The shape of a pixel-array region may be a convex polygon or a concave polygon.

Pixel-groups 421-425 have respective storage regions 431-435 that include storage regions 330 of pixels 320 that are part of the pixel-group. For example, storage regions 431 include storage regions 330 of pixels 320 that are part of pixel-group 421. When pixel 320 includes both storage region 330 and storage region 331, storage regions 431-435 may include storage region 330 only or both storage regions 330 and 331 of pixels 320 that are part of the pixel-group.

Figure 5:
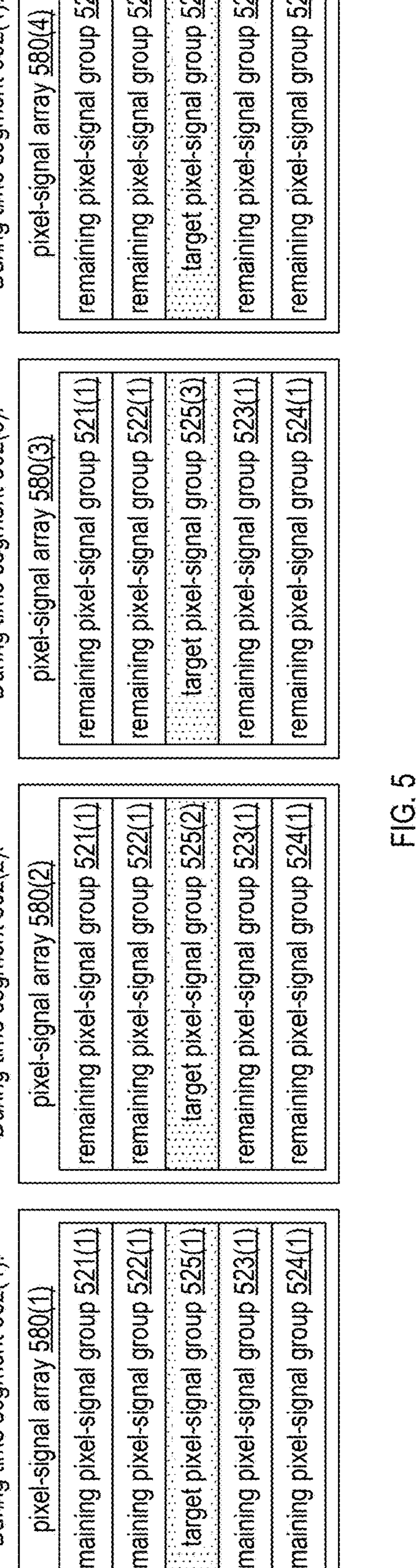
FIG. 5 is a schematic of pixel-signal groups generated by the pixel array of the imager sensor of FIG. 2 during a sequence of time segments, in an embodiment.

FIG. 5 is a schematic of pixel-signal arrays 580(1-4) generated by pixel array 310 and image sensor 300 and/or camera 200 to generate a temporal sequence of images 180. A pixel-signal array 580 includes a plurality of pixel signals each generated by a respective pixel 320 of image sensor 300.

FIG. 5 denotes a temporal sequence of time segments 502(1)-502(4), during which pixel array 310 generates respective pixel-signal arrays 580(1-4). The generation of a pixel-signal array 580(*k*) may occur during a time interval that is shorter than that of time segment 502(*k*), where index k is a positive integer less than or equal to four.

Time segment 502(1) begins before time segment 502(2), which begins before time segment 502(3), which begins before time segment 502(4). Consecutive time segments 502 may be temporally non-overlapping. For example, time segment 502(1) may end either before time segment 502(2) begins.

Each pixel-signal array 580 includes pixel-signal groups 521-525 generated by respective pixel-groups 421-425. FIG. 5 denotes pixel-signal groups 521-524 as "remaining" because the pixel-signals of each pixel-signal groups 521-524 are generated by pixels 320 of a respective remaining pixel-group 421-424.

FIG. 6 illustrates the pixel-signal groups 521-525 stored by storage regions 431-435 during at least part of time segments 502. During at least part of each of time segments 502(1)-502(4), remaining storage regions 431-434 store pixel-signal groups 521(1)-524(1), respectively. That is, each of remaining storage regions 431-434 stores the same pixel-signal group during each time segment 502(1)-502(4). By contrast, storage regions 435 stores a different pixel-signal group during each time segment 502(1)-502(4). During at least part of time segments 502(1)-502(4), storage regions 435 store target pixel-signal groups 525(1)-525(4), respectively.

When pixel 320 is a dual-storage pixel, and hence includes additional storage region 331, storage regions 435 may store multiple target pixel-signal groups, as illustrated in FIG. 6. For example, storage regions 435 may store at least one of (i) pixel-signal group 525(1) during both time segments 502(1) and 502(2), (ii) pixel-signal group 525(2) during both time segments 502(2) and 502(3), and (iii) pixel-signal group 525(3) during both time segments 502(3) and 502(4). Similarly, any one of storage regions 431-434 may store multiple target pixel-signal groups, also illustrated in FIG. 6. For example, storage regions 431 may (i) store either pixel-signal group 521(2) or 521(3) during time segment 502(3) and (ii) store either pixel-signal group 521(2) or 521(3) or 521(4) or during time segment 502(4).

During time segment 502(3), storage regions 435 may store, in addition to target pixel-signal group 525(3), one of target pixel-signal groups 525(1) and 525(2). During time segment 502(4), storage regions 435 may store, in addition to target pixel-signal group 525(4), one of target pixel-signal groups 525(1), 525(2), and 525(3). In embodiments, each pixel signal of a target pixel-signal group 525(1) is stored a respective storage region 330 while each pixel signal of subsequent pixel-signal groups 525(2≤k≤R) are stored in a respective additional storage region 331. Simultaneously storing an earlier target pixel-signal group such as target pixel-signal group 525(1), and subsequently captured target pixel-signal group (e.g., 525(2), 525(3), or 525(4)), allows for comparison of the two target pixel-signal groups.

FIG. 7 is a flowchart illustrating an image-capture method 700, which may be implemented by DMS 100 or by one or more components thereof. For example, method 700 may be implemented by image sensor 300 itself, or by processor 286 and image sensor 300. Method 700 includes at least one of steps 710, 720, 730, 740, 750, 760, 770, 780, and 790.

Step 710 includes capturing, with an image sensor having a pixel array, a first image of a scene by generating a first plurality of pixel signals. The first plurality of pixel signals includes (i) a target pixel-signal group $T_1$ generated by a target pixel-group having pixel-coordinates of a target region of the pixel array, (ii) a pixel-signal group $P_{11}$ generated by a first remaining pixel-group having pixel-coordinates of a first remaining pixel-array region of the pixel array, and (iii) a pixel-signal group $P_{21}$ generated by second remaining pixel-group having pixel-coordinates of a second remaining pixel-array region of the pixel array.

In an example of step 710, image sensor 300 captures an image of driver 194 by generating pixel-signal array 580(1) during time segment 502(1). Target pixel-signal group 525 (1), remaining pixel-signal group 521(1), and remaining pixel-signal group 522(1) are respective examples of the target pixel-signal group $T_1$, the pixel-signal group $P_{11}$, and the pixel-signal group $P_{21}$.

Step 720 includes transferring the first plurality of pixel signals to a storage region of the image sensor. In an example of step 720, for each pixel 320, pulsing the transfer gate of pixel 320 results in transferring its generated pixel-signal to storage region 330 of pixel 320. The pixel-signal is part of one of pixel-signal groups 521(1)-525(1).

In embodiments, the image sensor has a plurality of pixels, and the storage region includes a plurality of in-pixel analog storage elements, each of which being of a respective one of the plurality of pixels. Each storage region 330 is an example of an in-pixel analog storage element. In such embodiments, step 720 may include transferring each of the first plurality of pixel signals to a respective one of the plurality of in-pixel analog storage elements.

Step 730 includes reading the target pixel-signal group $T_1$ and the pixel-signal group $P_{11}$ from the storage region. In an example of step 730, readout circuitry 340 reads (i) target pixel-signal group 525(1) from a storage region 330 that is one of storage regions 435 and (ii) remaining pixel-signal group 521(1) from a storage region 330 that is one of storage regions 431. Step 730 may include abstaining from reading the pixel-signal group $P_{21}$. The example of step 730 may therefore include abstaining from reading remaining pixel-signal group 522(1).

Step 740 includes capturing a second image of the scene by generating a second plurality of pixel signals that includes a target pixel-signal group $T_2$ corresponding to the target pixel-group. In an example of step 740, image sensor 300 captures an image of driver 194 by generating pixel-signal array 580(2) during time segment 502(2). Target pixel-signal group 525(2) is an example of the target pixel-signal group $T_2$. The image capture of step 740 may begin before the signal reading of step 730 is completed, which may contribute to increased video frame rate.

Step 750 includes transferring the second plurality of pixel signals to the storage region. In an example of step 750, for each pixel 320 of target pixel-group 425, pulsing the transfer gate of pixel 320 results in transferring its generated pixel-signal to storage region 330 of pixel 320. The pixel-signal is part of pixel-signal group 525(2).

Steps 720 and 750 may include steps 722 and 752, respectively. Step 722 includes, when transferring the first plurality of pixel signals, transferring the target pixel-signal group $T_1$ to a target section of the storage region. In an example of step 722, the transferred generated pixel-signal of step 720 is transferred to target section 339 of storage region 330. Step 752 includes, when transferring the target pixel-signal group $T_2$, overwriting the target pixel-signal group $T_1$ to the target section with the target pixel-signal group $T_2$. In an example of step 752, transferring the generated pixel-signal of step 750 includes overwriting the target pixel-signal group $T_1$ stored in target section 339 with the target pixel-signal group $T_2$.

In embodiments, each of the plurality of pixels has a respective one of a plurality of additional in-pixel analog storage elements. The storage region includes the plurality of additional in-pixel analog storage elements. Each storage region 331 is an example of an additional in-pixel analog storage element. In such embodiments, step 750 may include transferring each of the second plurality of pixel signals to a respective one of the plurality of additional in-pixel analog storage elements.

The second plurality of pixel signals may include (i) the target pixel-signal group $T_2$ (e.g., pixel-signal groups 525 (2)), (ii) a pixel-signal group $P_{12}$ corresponding to the first remaining pixel-group that defines the first remaining pixel-array region (e.g., remaining pixel-signal group 521(2)), and (iii) a pixel-signal group $P_{22}$ corresponding to the second remaining pixel-group (e.g., remaining pixel-signal group 522(2)). In such embodiments, step 750 may include a step 754. Step 754 includes, transferring, of the target pixel-signal group $T_2$, the pixel-signal group $P_{12}$, and the pixel-signal group $P_{22}$, only the target pixel-signal group $T_2$ such that each pixel signal of the target pixel-signal group $T_2$ is transferred to a respective one of the plurality of additional in-pixel analog storage elements, In embodiments, the second plurality of pixel signals includes (i) the target pixel-signal group $T_2$, (ii) the pixel-signal group $P_{12}$, and (iii) the pixel-signal group $P_{22}$. In such embodiments, step 750 may include step 752. Step 752 includes transferring, of the target pixel-signal group $T_2$, the pixel-signal group $P_{12}$, and the pixel-signal group $P_{22}$, only the target pixel-signal group $T_2$ to the storage region. Target pixel-signal group 525(2), remaining pixel-signal group 521(2), and remaining pixel-signal group 522(2) are respective examples of the target pixel-signal group $T_2$, the pixel-signal group $P_{12}$, and the pixel-signal group $P_{22}$.

In an example of step 752, row driver 352 addresses only target pixel-group 425 during the execution of step 750. When each pixel 320 includes both storage regions 330 and 331, the storage region that receives the pixel-signal groups transferred in step 752 may be either of storage region 330 or additional storage region 331.

Step 760 includes reading the target pixel-signal group $T_2$ and the pixel-signal group $P_{21}$ from the storage region. In an example of step 760, readout circuitry 340 reads (i) target pixel-signal group 525(2) from a storage region 330 that is one of storage regions 435 and (ii) remaining pixel-signal group 522(1) from a storage region 330 that is one of storage regions 432. Step 760 may include abstaining from reading the pixel-signal group $P_{11}$. The example of step 760 may therefore include abstaining from reading remaining pixel-signal group 521(1).

When method 700 includes step 750, step 760 may include a step 764. Step 764 includes (i) reading the pixel-signal group $P_{21}$ from the plurality of in-pixel analog storage elements during a first time period; and (ii) reading the target pixel-signal group $T_2$ from the plurality of additional in-pixel analog storage elements during a second time period that at least partially temporally overlaps with the first time period.

Step 770 is a decision. When the first plurality of pixel signals includes additional pixel-signal groups, method 700 repeats steps 740, 750, and 760 with the second image and second plurality of pixel signals are replaced by a subsequent image and a subsequent plurality of pixel signals. In embodiments, the first plurality of pixel signals further includes a pixel-signal group $P_{31}$ corresponding to a third remaining pixel-group having pixel-coordinates of a third remaining pixel-array region. Remaining pixel-group 423 (FIG. 4) and remaining pixel-signal group 523(1) (FIG. 5) are respective examples of pixel-signal group $P_{31}$ and the third remaining pixel-group.

In such embodiments, repeating step 740 includes capturing a third image of the scene by generating a third plurality of pixel signals that includes a target pixel-signal group $T_3$ corresponding to the target pixel-group. In an example of repeating step 740, image sensor 300 captures an image of driver 194 by generating pixel-signal array 580(3) during time segment 502(3). Target pixel-signal group 525 (3) is an example of the target pixel-signal group $T_3$.

Capturing the second image occurs at a first temporal duration after capturing the first image. Capturing the third image occurring at a second temporal duration after capturing the second image. The second temporal duration may be substantially equal to the first temporal duration. For example, a relative difference between the second temporal duration and the third temporal duration may be less than ten percent.

Repeating step 740 a second time includes capturing a fourth image of the scene by generating a fourth plurality of pixel signals that includes a target pixel-signal group $T_4$ corresponding to the target pixel-group. In an example of repeating step 740 a second time, image sensor 300 captures an image of driver 194 by generating pixel-signal array 580(4) during time segment 502(4). Target pixel-signal group 525(4) is an example of the target pixel-signal group $T_4$.

Repeating step 750 includes transferring the third plurality of pixel signals to the storage region. In an example of repeating step 750, for each pixel 320 of target pixel-group 425, pulsing the transfer gate of pixel 320 results in transferring its generated pixel-signal to storage region 330 of pixel 320. The pixel-signal is part of pixel-signal group 525(3).

Repeating step 750 a second time includes transferring the fourth plurality of pixel signals to the storage region. In an example of repeating step 750 a second time, for each pixel 320 of target pixel-group 425, pulsing the transfer gate of pixel 320 results in transferring its generated pixel-signal to storage region 330 of pixel 320. The pixel-signal is part of pixel-signal group 525(4).

Repeating step 760 includes reading the target pixel-signal group $T_3$ and the pixel-signal group $P_{31}$ from the storage region. In an example of repeating step 760, readout circuitry 340 reads (i) target pixel-signal group 525(3) from a storage region 330 that is one of storage regions 435 and (ii) remaining pixel-signal group 523(1) from a storage region 330 that is one of storage regions 432.

Repeating step 760 a second time includes reading the target pixel-signal group $T_4$ and the pixel-signal group $P_{41}$ from the storage region. In an example of repeating step 760 a second time, readout circuitry 340 reads (i) target pixel-signal group 525(4) from a storage region 330 that is one of storage regions 435 and (ii) remaining pixel-signal group 524(1) from a storage region 330 that is one of storage regions 432.

In embodiments, repeating step 760 includes reading just one remaining pixel-signal group. That is, reading the target pixel-signal group $T_4$ and the pixel-signal group $P_{41}$ includes reading the target pixel-signal group $T_4$ and the pixel-signal group $P_{41}$ while abstaining from reading each of the pixel-signal group $P_{11}$, and the pixel-signal group $P_{21}$, and the pixel-signal group $P_{31}$.

Method 700 may include repeating each of steps 740, 750, and 760 additional times after the second repetitions described above. The number of repetitions may exceed the number of storage regions of each pixel 320.

Step 780 includes clearing the storage region after reading the target pixel-signal group $T_2$ and the pixel-signal group $P_{21}$. In an example of step 780, storage regions 330 of pixels 320 that are part of target pixel-group 425 or remaining pixel-group 421 are cleared, e.g., by a reset transistor of pixel 320.

Step 790 includes determining a difference between (i) a first ROI image generated at least in part from the target pixel-signal group $T_1$ and (ii) a second ROI image generated at least in part from the target pixel-signal group $T_2$. Step 790 may be executed at least in part by circuitry 102, a processor of image sensor 300, or a combination thereof. Step 780 may be executed either before step 790, after step 790, or simultaneously with step 790.

Figure 8:
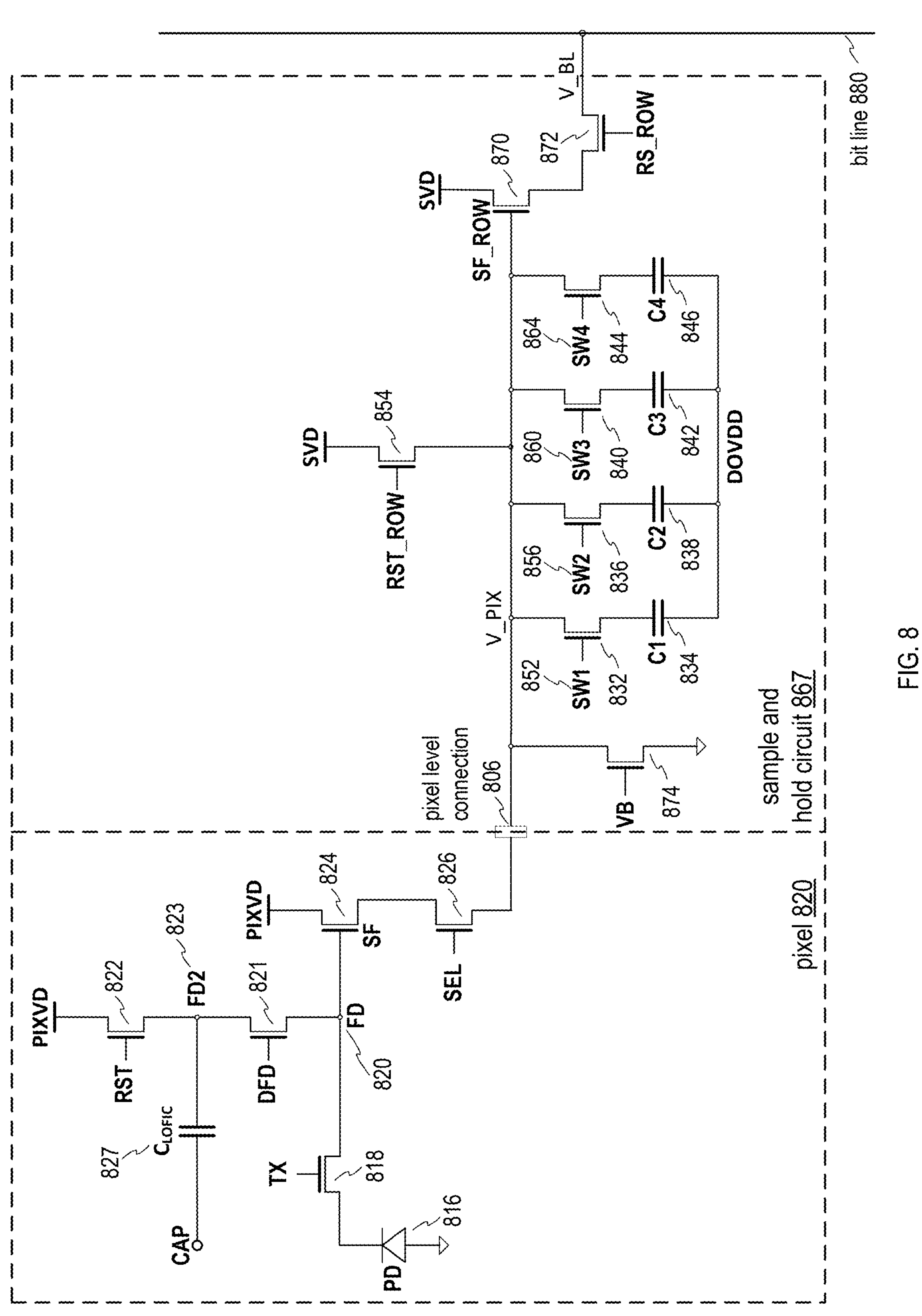
FIG. 8 is a circuit diagram of a pixel and a sample-and-hold circuit, in an embodiment.

FIG. 8 is a circuit diagram of a pixel 820 and a sample-and-hold circuit 867, which are respective examples of pixel 320 and sample-and-hold circuit 367. Pixel 820 includes a photodiode 816, which is coupled to photogenerate image charge in response to incident light. A transfer transistor 818 is coupled to transfer the photogenerated image charge from photodiode 816 to a floating diffusion (FD) 820 in response to a transfer signal TX. Pixel 820 may include one or both of a dual floating diffusion (DFD) transistor 821 and a second floating diffusion (FD2) 823.

A reset transistor 822 is coupled to a pixel voltage supply PIXVD to reset FD2 823 in response to a reset signal RST and further to reset FD 820 simultaneously in response to a dual floating diffusion signal DFD. In embodiments, pixel 820 includes a capacitor $C_{LOFIC}$ 827, which is a lateral overflow integration capacitor (LOFIC). Capacitor $C_{LOFIC}$ 827 is coupled to receive a bias voltage CAP as shown. $C_{LOFIC}$ 827 is coupled between the FD2 823 and a voltage source held at bias voltage CAP as shown.

The gate of a source follower (SF) transistor 824 is coupled to convert the charge in floating diffusion 820 to an image voltage signal, which is coupled to be output through a select transistor 826 to a pixel level connection 806 in response to a select signal SEL. Pixel level connection 806 may be a hybrid bond.

In an imaging system that utilizes CDS, the charge on the floating diffusion 820 is also read out through pixel level connection 806 after a floating diffusion reset operation, in response to both RST and DFD signals simultaneously, to obtain a reset level, and the charge on FD 820 is also read out through the pixel level connection 806 after the image charge is transferred to FD 820 to obtain a signal voltage.

Continuing with the depicted example, the sample-and-hold circuit 867 includes a first storage transistor 832 that is coupled to the pixel level connection 806 to sample and hold a first reset voltage from pixel 820 into a first storage device C1 834 in response to a first reset storage signal SW1 852. In embodiments, storage region 330 includes storage devices C1 and C2, while additional storage region 331 includes storage devices C3 and C4.

In the example, first storage device C1 834 of the sample-and-hold circuit 867 is a capacitor. In addition, sample-and-hold circuit 867 also includes a second storage transistor 836 that is coupled to pixel level connection 806 to sample and hold a first signal voltage from pixel 820 into a second storage device C2 838 in response to a first signal storage signal SW2 856. In the example, second storage device C2 838 of sample-and-hold circuit 867 is a capacitor. Sample-and-hold circuit 867 includes a third storage transistor 840 that is coupled to pixel level connection 806 to sample and hold a second reset voltage from pixel 820 into a third storage device C3 842 in response to a second reset storage signal SW3 860. In the example, third storage device C3 842 of sample-and-hold circuit 867 is a capacitor. In the said expansion above, sample-and-hold circuit 867 also includes a fourth storage transistor 844 that is coupled to pixel level connection 806 to sample and hold a second signal voltage from pixel 820 into a fourth storage device C4 846 in response to a second signal storage signal SW4 864. In the example, fourth storage device C4 846 of sample-and-hold circuit 867 is a capacitor.

First reset storage signal SW1 852, first signal storage signal SW2 856, second reset storage signal SW3 860 (due to the said expansion), and second signal storage signal SW4

864 (due to the said expansion) are generated by sample-and-hold switch driver circuitry 358 of control circuitry 350.

A reset row transistor 854 is coupled between a supply voltage SVD and pixel level connection 806. Reset row transistor 854 is responsive to a reset row signal RST_ROW. Reset row transistor 854 is an example of a reset transistor of pixel 320. In the depicted example, a source follower row transistor 870 having a gate is coupled to pixel level connection 806. A row-select row transistor 872 is coupled between source follower row transistor 870 and a bitline 880. Row-select row transistor 872 is responsive to a row-select row signal RS_ROW. In the depicted example, a bias transistor 874 that is biased with a bias voltage VB is coupled between pixel level connection 806 and ground. Bias transistor 874 serves as a sample and hold (SH) current source. The SH current source provides current to SF transistor 824 and pixel level connection 806 with a typical value of ~20 nA.

Figure 9:
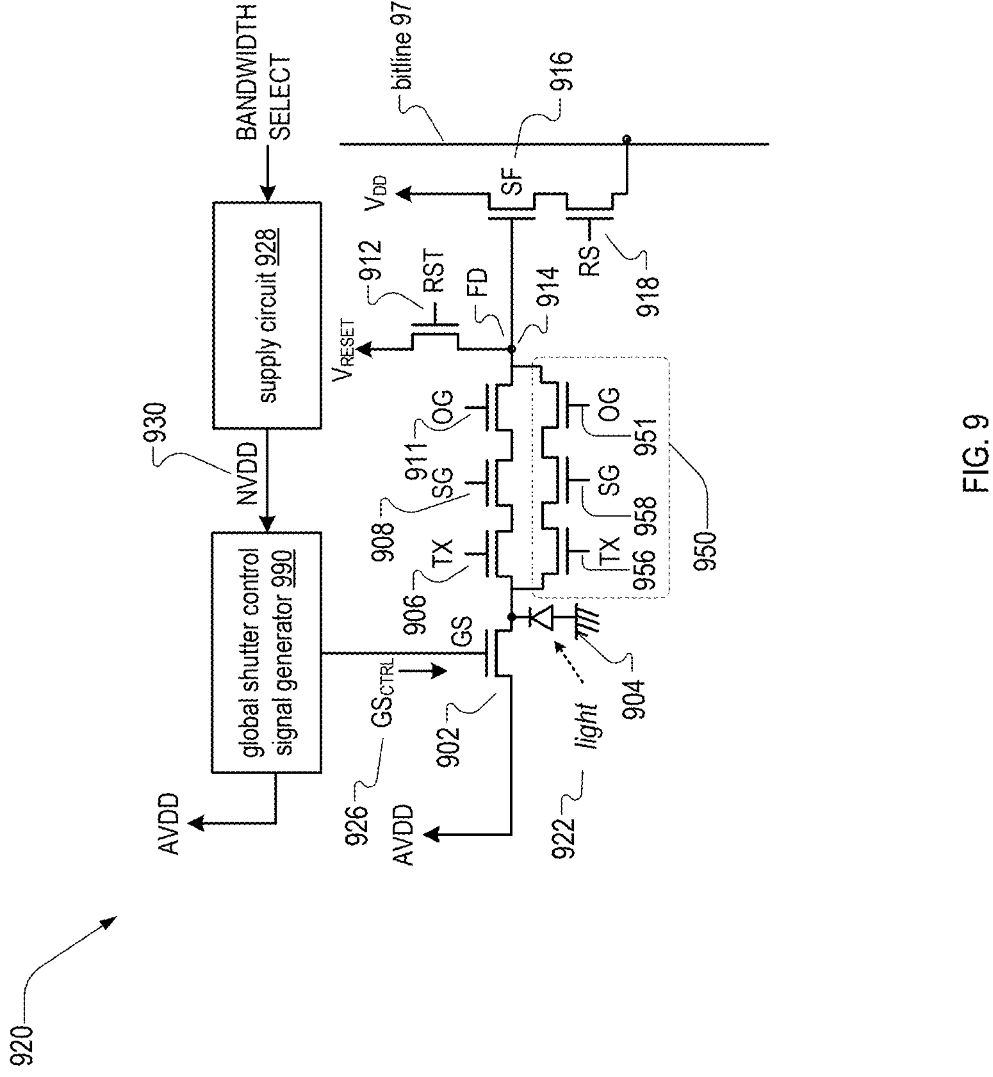
FIG. 9 is a circuit diagram of a pixel and a sample-and-hold circuit, in an embodiment.

FIG. 9 is a circuit diagram of a pixel 920, which is an example of pixel 320. Pixel 920 has a global shutter, which may be controlled with a global shutter control signal generator 990. In the example, global shutter control signal generator 990 is coupled to receive a negative NVDD voltage 930 from a supply circuit 928, which may have variable bandwidth. Pixel 920 may be one of a plurality of pixel cells in pixel array 310. As shown in the depicted example, pixel 920 includes a global shutter transistor 902, a photodiode 904, a transfer transistor 906, a storage transistor 908, an output transistor 911, a readout node 914, a reset transistor 912, an amplifier transistor 916, and a row select transistor 918 coupled to a bitline 978. In one example, readout node 914 is a floating diffusion disposed in the semiconductor material of pixel 920. In one example, amplifier transistor 916 is implemented with a source follower coupled transistor. As shown in the example of FIG. 9, global shutter transistor 902 is coupled between an AVDD voltage and photodiode 904.

In operation, global shutter transistor 902 is coupled to selectively deplete the image charge that has accumulated in photodiode 904 prior to a normal exposure operation by selectively coupling photodiode 904 to voltage AVDD in response to a global shutter control signal GS CTRL 926, which is generated by global shutter control signal generator 990. In the example, all pixel cells 900 included in a pixel array of an image sensor share the global shutter control signal GS CTRL 926 to implement a global shutter. After the image charge in photodiode 904 has been depleted through global shutter transistor 902, global shutter control signal GS CTRL 926 transitions to NVDD to switch global shutter transistor 902 into a low leakage off mode. As shown in the depicted example, negative NVDD voltage 930 is provided by the supply circuit 928. As will be discussed in greater detail below, during a first portion of the off time of global shutter transistor 902, the bandwidth of global shutter control signal GS CTRL 926 is set to have a large bandwidth to provide a fast settling time. During a second portion of the off time of global shutter transistor 902, the bandwidth of global shutter control signal GS CTRL 926 is set to have a small bandwidth to provide a low noise and ripple in accordance with the teachings of the present invention.

After global shutter switch 902 has been turned off in response to global shutter control signal GS CTRL 926, photodiode 904 disposed in the semiconductor material of pixel 920 then begins to accumulate image charge in response to incident light 922 directed to photodiode 904 during a normal exposure operation. In one example, incident light 922 may be directed through a front side of the semiconductor material of pixel 920. In another example, it is appreciated that incident light 922 may be directed through a backside of the semiconductor material of pixel 920. After the normal exposure operation, the image charge that is accumulated in photodiode 904 is transferred to an input of storage transistor 908 through transfer transistor 906. Storage transistor 908 is an example of storage region 330 of pixel 320.

The example in FIG. 9 also illustrates that output transistor 911 is coupled to an output of storage transistor 908 to selectively transfer the image charge from storage transistor 908 to readout node 914, which in the illustrated example is a floating diffusion FD. A reset transistor 912 is coupled between a reset voltage VRESET and readout node 914 to selectively reset the charge in readout node 914 in response to a reset signal RST. In the example, amplifier transistor 916 includes an amplifier gate coupled to readout node 914 to amplify the signal on readout node 914 to output image data from pixel 920. Row select transistor 918 is coupled between bitline 978 and amplifier transistor 916 to output the image data to bitline 978.

In embodiments, pixel 920 includes circuitry 950 in parallel with transfer transistor 906, storage transistor 908, and output transistor 911. Circuitry 950 includes a transistor 956, a storage transistor 958, and an output transistor 951, which are analogous to transistor 906, storage transistor 908, and output transistor 911, respectively. Storage transistor 958 is an example of storage region 331.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments.

Regarding instances of the terms "and/or" and "at least one of," for example, in the cases of "A and/or B" and "at least one of A and B," such phrasing encompasses the selection of (i) A only, or (ii) B only, or (iii) both A and B. In the cases of "A, B, and/or C" and "at least one of A, B, and C," such phrasing encompasses the selection of (i) A only, or (ii) B only, or (iii) C only, or (iv) A and B only, or (v) A and C only, or (vi) B and C only, or (vii) each of A and B and C. This may be extended for as many items as are listed.

The following claims are intended to cover all generic and specific features described herein, as well as all statements of the scope of the present method and system, which, as a matter of language, might be said to fall therebetween.

I claim:

1. An image-capture method comprising:

capturing, with an image sensor having a pixel array, a first image of a scene by generating a first plurality of pixel signals that includes (i) a target pixel-signal group $T_1$ generated by a target pixel-group having pixel-coordinates of a target region of the pixel array, (ii) a pixel-signal group $P_{11}$ generated by a first remaining pixel-group having pixel-coordinates of a first remaining pixel-array region of the pixel array, and (iii) a pixel-signal group $P_{21}$ generated by second remaining pixel-group having pixel-coordinates of a second remaining pixel-array region of the pixel array;

transferring the first plurality of pixel signals to a storage region of the image sensor;

reading the target pixel-signal group $T_1$ and the pixel-signal group $P_{11}$ from the storage region;

capturing a second image of the scene by generating a second plurality of pixel signals that includes a target pixel-signal group $T_2$ corresponding to the target pixel-group;

transferring the second plurality of pixel signals to the storage region; and reading the target pixel-signal group $T_2$ and the pixel-signal group $P_{21}$ from the storage region.

2. The method of claim 1, the second plurality of pixel signals including (i) the target pixel-signal group $T_2$, (ii) a pixel-signal group $P_{12}$ corresponding to the first remaining pixel-group that defines the first remaining pixel-array region, and (iii) a pixel-signal group $P_{22}$ corresponding to the second remaining pixel-group, wherein transferring the second plurality of pixel signals comprises:

transferring, of the target pixel-signal group $T_2$, the pixel-signal group $P_{12}$, and the pixel-signal group $P_{22}$, only the target pixel-signal group $T_2$ to the storage region.

3. The method of claim 1, reading the target pixel-signal group $T_1$ and the pixel-signal group $P_{11}$ comprising reading the target pixel-signal group $T_1$ and the pixel-signal group $P_{11}$ while abstaining from reading the pixel-signal group $P_{21}$; and reading the target pixel-signal group $T_2$ and the pixel-signal group $P_{21}$ comprising reading the target pixel-signal group $T_2$ and the pixel-signal group $P_{21}$ while abstaining from reading the pixel-signal group $P_{11}$.

4. The method of claim 1, further comprising clearing the storage region after reading the target pixel-signal group $T_2$ and the pixel-signal group $P_{21}$.

5. The method of claim 1, transferring the first plurality of pixel signals including transferring the target pixel-signal group $T_1$ to a target section of the storage region; and transferring the target pixel-signal group $T_2$ including overwriting the target pixel-signal group $T_1$ stored in the target section with the target pixel-signal group $T_2$.

6. The method of claim 1, the target pixel-group, the first remaining pixel-group, and the second remaining pixel-group being non-overlapping and contiguous.

7. The method of claim 1, each of the first plurality of pixel signals being mapped to a respective pixel-coordinate of a pixel-coordinate array, the target pixel-group being between the first remaining pixel-group and the second remaining pixel-group.

8. The method of claim 1, the first plurality of pixel signals further including (iv) a pixel-signal group $P_{31}$ corresponding to a third remaining pixel-group having pixel-coordinates of a third remaining pixel-array region, and further comprising:

capturing a third image of the scene by generating a third plurality of pixel signals that includes a target pixel-signal group $T_3$ corresponding to the target pixel-group;

transferring the third plurality of pixel signals to the storage region; and reading the target pixel-signal group $T_3$ and the pixel-signal group $P_{31}$ from the storage region.

9. The method of claim 8, reading the target pixel-signal group $T_3$ and the pixel-signal group $P_{31}$ comprising:

reading the target pixel-signal group $T_3$ and the pixel-signal group $P_{31}$ while abstaining from reading each of the pixel-signal group $P_{11}$ and the pixel-signal group $P_{21}$.

10. The method of claim 8, capturing the second image occurring at a first temporal duration after capturing the first image, capturing the third image occurring at a second temporal duration after capturing the second image, the second temporal duration being substantially equal to the first temporal duration.

11. The method of claim 8, further comprising clearing the storage region after reading the target pixel-signal group $T_3$ and the pixel-signal group $P_{31}$.

12. The method of claim 8, the target pixel-group, the first remaining pixel-group, and the second remaining pixel-group, and the third remaining pixel-group being non-overlapping and contiguous.

13. The method of claim 8, the first plurality of pixel signals further including (v) a pixel-signal group $P_{41}$ corresponding to a fourth remaining pixel-group having pixel-coordinates of a fourth remaining pixel-array region, and further comprising:

capturing a fourth image of the scene by generating a fourth plurality of pixel signals that includes a target pixel-signal group $T_4$ corresponding to the target pixel-group;

transferring the fourth plurality of pixel signals to the storage region; and reading the target pixel-signal group $T_4$ and the pixel-signal group $P_{41}$ from the storage region.

14. The method of claim 13, reading the target pixel-signal group $T_4$ and the pixel-signal group $P_{41}$ comprising reading the target pixel-signal group $T_4$ and the pixel-signal group $P_{41}$ while abstaining from reading each of the pixel-signal group $P_{11}$, and the pixel-signal group $P_{21}$, and the pixel-signal group $P_{31}$.

15. The method of claim 13, capturing the second image occurring at a first temporal duration after capturing the first image;

capturing the third image occurring at a second temporal duration after capturing the second image;

capturing the fourth image occurring at a third temporal duration after capturing the third image;

the second temporal duration being substantially equal to the first temporal duration; and the third temporal duration being substantially equal to the second temporal duration.

16. The method of claim 13, further comprising clearing the storage region after reading the target pixel-signal group $T_4$ and the pixel-signal group $P_{41}$.

17. The method of claim 13, the target pixel-group, the first remaining pixel-group, and the second remaining pixel-group, the third remaining pixel-group, and the fourth remaining pixel-group being non-overlapping and contiguous.

18. The method of claim 1, the image sensor having a plurality of pixels, the storage region including a plurality of in-pixel analog storage elements, each of which being of a respective one of the plurality of pixels, transferring the first plurality of pixel signals comprising transferring each of the first plurality of pixel signals to a respective one of the plurality of in-pixel analog storage elements.

19. The method of claim 18, each of the plurality of pixels having a respective one of a plurality of additional in-pixel analog storage elements, the storage region including the plurality of additional in-pixel analog storage elements and the second plurality of pixel signals including (i) the target pixel-signal group $T_2$, (ii) a pixel-signal group $P_{12}$ corresponding to the first remaining pixel-group that defines the first remaining pixel-array region, and (iii) a pixel-signal group $P_{22}$ corresponding to the second remaining pixel-group, transferring the second plurality of pixel signals further comprising transferring, to a respective one of the plurality of additional in-pixel analog storage elements, each pixel signal of the target pixel-signal group $T_2$.

20. The method of claim 19, wherein transferring the second plurality of pixels signals comprises:

transferring, of the target pixel-signal group $T_2$, the pixel-signal group $P_{12}$, and the pixel-signal group $P_{22}$, only the target pixel-signal group $T_2$, such that each pixel signal of the target pixel-signal group $T_2$ is transferred to a respective one of the plurality of additional in-pixel analog storage elements.

21. The method of claim 19, wherein transferring the second plurality of pixel signals comprises transferring each of the second plurality of pixel signals to a respective one of the plurality of additional in-pixel analog storage elements.

22. The method of claim 19, said reading the target pixel-signal group $T_2$ and the pixel-signal group $P_{21}$ comprising:

reading the pixel-signal group $P_{21}$ from the plurality of in-pixel analog storage elements during a first time period; and reading the target pixel-signal group $T_2$ from the plurality of additional in-pixel analog storage elements during a second time period that at least partially temporally overlaps with the first time period.

23. The method of claim 1, the image sensor including a plurality of pixels, capturing the first image of the scene including generating, with each of the plurality of pixels, a respective one of the first plurality of pixel signals.

24. The method of claim 1, wherein capturing the second image begins before said reading the target pixel-signal group $T_1$ and the pixel-signal group $P_{11}$ is completed.

25. The method of claim 1, the image sensor having a plurality of pixels each having a respective one of a plurality of in-pixel analog storage elements and a respective one of a plurality of additional in-pixel analog storage elements, the storage region including each of the plurality of in-pixel analog storage elements and the plurality of additional in-pixel analog storage elements, transferring the first plurality of pixel signals comprising transferring each of the first plurality of pixel signals to a respective one of the plurality of in-pixel analog storage elements.

26. The method of claim 25, the second plurality of pixel signals being the target pixel-signal group $T_2$, and transferring the second plurality of pixel signals includes:

transferring the target pixel-signal group $T_2$ to the plurality of additional in-pixel analog storage elements.

27. The method of claim 26, wherein reading the target pixel-signal group $T_2$ and the pixel-signal group $P_{21}$ from the storage region comprises:

reading the target pixel-signal group $T_2$ from the plurality of additional in-pixel analog storage elements; and reading the pixel-signal group $P_{21}$ from the plurality of in-pixel analog storage elements.

28. The method of claim 27, further comprising clearing the storage region after reading the target pixel-signal group $T_2$ and the pixel-signal group $P_{21}$.

29. The method of claim 27, the plurality of additional in-pixel storage elements including a first section and a second section, wherein no additional in-pixel analog storage elements are in both the first section and the second section, reading the target pixel-signal group $T_2$ comprising reading the target pixel-signal group $T_2$ from the first section;

the first plurality of pixel signals further including (iv) a pixel-signal group $P_{31}$ corresponding to a third remaining pixel-group having pixel-coordinates of a third remaining pixel-array region, and the method further comprising:

capturing a third image of the scene by generating a third plurality of pixel signals that includes a target pixel-signal group $T_3$ corresponding to the target pixel-group; and transferring the target pixel-signal group $T_3$ to the second section.

30. The method of claim 29, the third plurality of pixel signals including (i) the target pixel-signal group $T_3$, (ii) a pixel-signal group $P_{13}$ corresponding to the first remaining pixel-group that defines the first remaining pixel-array region, and (iii) a pixel-signal group $P_{23}$ corresponding to the second remaining pixel-group, wherein transferring the third plurality of pixel signals comprises:

transferring, of the target pixel-signal group $T_3$, the pixel-signal group $P_{13}$, and the pixel-signal group $P_{23}$, only the target pixel-signal group $T_3$, such that each pixel signal of the target pixel-signal group $T_3$ is transferred to the plurality of additional in-pixel analog storage elements; and reading the target pixel-signal group $T_3$ and the pixel-signal group $P_{31}$ from the storage region.

31. The method of claim 29, the third plurality of pixel signals including (i) the target pixel-signal group $T_3$, (ii) a pixel-signal group $P_{13}$ corresponding to the first remaining pixel-group that defines the first remaining pixel-array region, and (iii) a pixel-signal group $P_{23}$ corresponding to the second remaining pixel-group, wherein transferring the third plurality of pixel signals comprises transferring each of the third plurality of pixel signals to a respective one of the plurality of additional in-pixel analog storage elements.

32. The method of claim 29, wherein reading the target pixel-signal group $T_3$ and the pixel-signal group $P_{31}$ from the storage region comprises:

reading the target pixel-signal group $T_3$ from the plurality of additional in-pixel analog storage elements; and reading the pixel-signal group $P_{31}$ from the plurality of in-pixel analog storage elements.

33. The method of claim 32, further comprising clearing the storage region after reading the target pixel-signal group $T_3$ and the pixel-signal group $P_{31}$.

34. The method of claim 29, the first plurality of pixel signals further including (v) a pixel-signal group $P_{41}$ corresponding to a fourth remaining pixel-group having pixel-coordinates of a fourth remaining pixel-array region, the method further comprising:

capturing a fourth image of the scene by generating a fourth plurality of pixel signals that includes a target pixel-signal group $T_4$ corresponding to the target pixel-group; and transferring the target pixel-signal group $T_4$ to one of the first section and the second section;

said transferring the target pixel-signal group $T_4$ including overwriting either (i) the target pixel-signal group $T_2$ stored in the first section with the target pixel-signal group $T_4$ or (ii) the target pixel-signal group $T_3$ stored in the second section with the target pixel-signal group $T_4$.

35. The method of claim 34, wherein reading the target pixel-signal group $T_4$ and the pixel-signal group $P_{41}$ from the storage region comprises:

reading the target pixel-signal group $T_4$ from the plurality of additional in-pixel analog storage elements; and reading the pixel-signal group $P_{41}$ from the plurality of in-pixel analog storage elements.

36. The method of claim 35, further comprising clearing the storage region after reading the target pixel-signal group $T_4$ and the pixel-signal group $P_{41}$.

37. A driver monitoring system comprising circuitry that executes an image capture method comprising:

capturing, with an image sensor having a pixel array, a first image of a scene by generating a first plurality of pixel signals that includes (i) a target pixel-signal group $T_1$ generated by a target pixel-group having pixel-coordinates of a target region of the pixel array, (ii) a pixel-signal group $P_{11}$ generated by a first remaining pixel-group having pixel-coordinates of a first remaining pixel-array region of the pixel array, and (iii) a pixel-signal group $P_{21}$ generated by second remaining pixel-group having pixel-coordinates of a second remaining pixel-array region of the pixel array;

transferring the first plurality of pixel signals to a storage region of the image sensor;

reading the target pixel-signal group $T_1$ and the pixel-signal group Pu from the storage region;

capturing a second image of the scene by generating a second plurality of pixel signals that includes a target pixel-signal group $T_2$ corresponding to the target pixel-group;

transferring the second plurality of pixel signals to the storage region; and reading the target pixel-signal group $T_2$ and the pixel-signal group $P_{21}$ from the storage region.

* * * * *